UNITED STATES PATENT OFFICE.

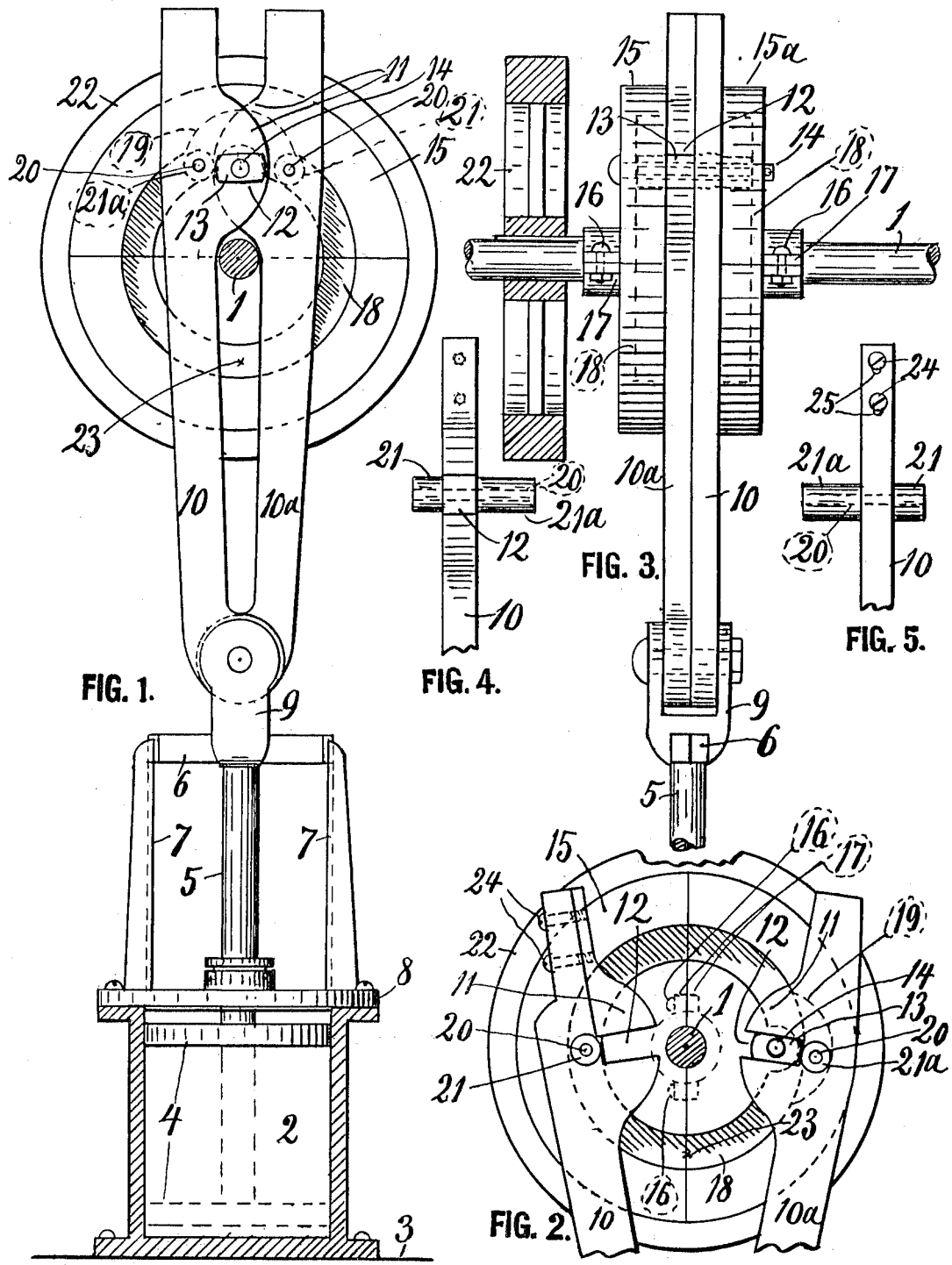

ANDERS J. JACOBSON, OF OSCEOLA, WISCONSIN, ASSIGNOR OF ONE-HALF TO JOHN EKSTRAND, OF OSCEOLA, WISCONSIN.

SUBSTITUTE FOR CRANKS.

1,054,350.  Specification of Letters Patent. Patented Feb. 25, 1913.

Application filed June 29, 1912. Serial No. 706,641.

*To all whom it may concern:*

Be it known that I, ANDERS J. JACOBSON, a subject of the King of Sweden, who have declared my intention to become a citizen of the United States, residing at Osceola, in the county of Polk and State of Wisconsin, have invented a new and useful Substitute for Cranks, of which the following is a specification.

My invention relates to substitutes for cranks, and the object is to provide a device by which either the end or any other part of a shaft may receive rotary motion from a reciprocated body, and the same device will also convert the rotary motion of a driven shaft into reciprocating motion.

In the accompanying drawing:—Figure 1 is an end view of a shaft provided with my device and a cylinder in diametrical section and a piston in the cylinder, with a piston rod connected with the device so as to either operate or be operated by the shaft. Fig. 2 is the upper portion of Fig. 1 with the shaft and the parts fixed on it turned 90 degrees around. Fig. 3 is a side view of the upper part of Fig. 1 looking from left to right with a second disk added, so as to make the device steadier and stronger. Fig. 4 is an inner edge view of the pitman shown to the left in Fig. 2. Fig. 5 is an outer edge view of the part shown in Fig. 4.

Referring to the drawing by reference numerals, 1 designates a shaft, say a line shaft in a factory for instance, and 2 is the cylinder secured on the floor 3 of the factory. In the cylinder is a piston having a piston rod 5 with a cross-head 6 which is steadied by guides 7 fixed on the cylinder cover 8.

In a fork 9 of the cross-head are pivoted the lower ends of two flat pitmen 10, 10ª, each of which has the inner edge provided with a cam-shaped projection 11 having in the middle a notch 12 (best shown in Fig. 2). Said notches are so arranged that each of them may receive laterally about half the length of a block 13, which revolves on a pivot 14 secured in a disk 15. Said disk is preferably made in halves and secured on the shaft by bolts 16 through lugs 17, so that the disk may be secured upon any part of a shaft without removing the shaft from its bearings or disturbing pulleys already secured on the shaft. In Fig. 3, where two such disks are employed the pivot 14 is secured with one end in each of them and the pitmen are placed loosely between the disks 15 and 15ª. The side of each disk adjacent the pitmen is provided with an annular groove 18, having at one point a semicircular outward curve 19. Moving in said groove are two anti-friction rollers 21 and 21ª, each of which rotates on a stud 20 fixed in one of the pitmen. One of said rollers is short, the other, 21ª, is longer so as to reach across the pitman having the short roller and into the same groove as the short roller. When two disks are employed the pitmen have such rollers at both sides and the same stud is extended through both of them, as shown in Figs. 3, 4 and 5; and in Fig. 2 is shown that one roller 21 and one 21ª are ready to enter the groove of the second disk.

22 designates a combined fly-wheel and pulley fixed on the shaft 1.

In the operation of the device, if the shaft 1 is rotated by a belt (not shown) put on the pulley wheel 22 and the piston 4 is that of a pump or other device in which reciprocating motion is desired, the rotation of the shaft and disks in either direction will cause the block 13 and the crank pin 14 to act on one of the pitmen and impart say a downward stroke to it, and as the block passes the lowest point (23 in Fig. 1) it passes into the notch 12 of the other pitman, which has descended idle, and pulls that upward to the highest point and then engages the first-actuated pitman and brings it downward, and so on the crank pin 14 and its block 13 act continuously pulling one pitman upward and the other downward. If the piston be driven by steam, compressed air or other force and the shaft 1 is to receive rotary motion therefrom, the pitmen will act on the block 13 and the crank pin 14 and turn the disk or disks in which the crank pin is fixed and thereby the shaft, and the flywheel 22 will carry the crank pin over the dead-centers 23 and the one diametrically opposite therefrom. The offset 19 in the groove 18 is to permit the guiding rollers 21, 21ª to pass beyond the crank pin during each half-stroke of the crank pin, as can be seen in Fig. 2. Said guiding rollers 21, 21ª not only guide the pitmen in their movements but also prevent them from leaving the block 13 until the latter is fully received by the notch of the next pitman.

It is obvious that while I have shown the reciprocated parts as movable in vertical direction they may just as well move in horizontal or any other direction. Also that the device may be applied either to the end or to any other part of the shaft and may have either one or two of the grooved disks. The device is applicable to pumping engines, wind mills and in a great many other places, especially as a substitute for center cranks and eccentrics.

In Figs. 2 and 5 24 are screws in slots 25 for adjusting the upper part of portion 11 of each pitman when the block 13 wears.

What I claim is:—

1. The combination with a shaft of a disk secured thereon and having at one side a concentric groove with a short semicircular curve toward the periphery of the disk, a crank pin fixed at the center of the curve, a block rotatable on the crank pin, a reciprocal member, two pitmen pivoted each with one end to said member, the other ends moving one at each side of the shaft and having each a notch adapted to receive the block of the crank pin, and means on each pitman for engagement with the groove of the disk so as to spread and close the pitmen and to hold each of them alternately engaged with the block during one half revolution of the disk.

2. The combination with the shaft of a disk secured thereon and having at one side a concentric groove with a short semicircular curve toward the periphery of the disk, a crank pin fixed at the center of the curve, a block rotatable on the crank pin, a reciprocal member, two pitmen pivoted each with one end to said member, the other ends moving one at each side of the shaft and having each a notch adapted to receive the block of the crank pin, and means on each pitman for engagement with the groove of the disk so as to spread and close the pitmen and to hold each of them alternately engaged with the block during one half revolution of the disk, said disk being divided diametrically and having lugs and bolts therethrough for securing it upon any part of the shaft.

3. The combination with a shaft of a disk secured thereon and having at one side a concentric groove with a short semicircular curve toward the periphery of the disk, a crank pin fixed at the center of the curve, a block rotatable on the crank pin, a reciprocal member, two pitmen pivoted each with one end to said member, the other ends moving one at each side of the shaft and having each a notch adapted to receive the block of the crank pin, and means on each pitman for engagement with the groove of the disk so as to spread and close the pitmen and to hold each of them alternately engaged with the block during one half revolution of the disk, and a fly wheel fixed on the shaft.

4. The combination with a shaft of two disks secured thereon and having their adjacent sides provided with corresponding concentric grooves, each with a segmental curve toward the periphery of the disk, a crank pin extending between the two disks at the center of the segmental curves, a block rotatable on the crank pin, a reciprocal member, two pitmen having each one end pivoted to said member, the other ends being arranged between the disks one at each side of the shaft and provided each with a notch adapted to receive the block of the crank pin and means on each pitman for engagement in the grooves of the disks, for the purposes set forth.

5. The combination with the shaft, of a crank securable upon any part of the shaft intermediate the ends thereof, a reciprocal member adapted to either receive or impart motion, two pitmen extending from said member and arranged at opposite sides of the shatf, each pitman having at the side nearest the shaft a notch adapted to receive the crank pin and either receive motion from it or impart motion to it during one half turn of the crank, said crank being disk-shaped and adjacent the pitmen provided with a concentric groove having at one point a segmental curve toward the periphery of the disk, and guiding means on the pitmen engaging in said groove.

In testimony whereof I affix my signature, in presence of two witnesses.

ANDERS J. JACOBSON.

Witnesses:
G. F. FISCHER,
A. F. SOLOMONSON.